3,506,687
PRODUCTION OF TRANS-8-OXABICYCLO (4.3.0) NONANE
Earl W. Wilson and Robert M. Simons, Kingsport, Tenn., assignors to Eastman Kodak Company, Rochester, N.Y., a corporation of New Jersey
No Drawing. Filed Oct. 25, 1967, Ser. No. 677,875
Int. Cl. C07d 5/04
U.S. Cl. 260—346.2                3 Claims

ABSTRACT OF THE DISCLOSURE

Relatively pure trans-8-oxabicyclo(4.3.0)nonane is prepared from mixtures of cis and trans 1,2-cyclohexanedimethanol. Preferential dehydration of cis-1,2-cyclohexanedimethanol to the cyclic ether and removal of the cis-8-oxabicyclo(4.3.0)nonane as a water azeotrope increases the concentration of the trans-glycol in the reaction mixture, which glycol may be converted to the trans-ether by conventional methods. Trans-ether is a starting material for certain elastomeric polymers.

---

This invention relates to the production of trans-8-oxabicyclo (4.3.0) nonane and particularly to a process by which the trans isomer is obtained in high concentrations with only small amounts of cis-8-oxabicyclo (4.3.0) nonane.

Dehydration of 1,2-cyclohexanedimethanol through the action of heat and such dehydrating agents as mineral acids, organic acids, alumina, etc. is the method generally used to prepare 8-oxabicyclo (4.3.0) nonane. Since 1,2-cyclohexanedimethanol exists as the cis and trans isomers, upon dehydration there is formed a mixture of cis and trans 8-oxabicyclo (4.3.0) nonane. The trans material is quite reactive and finds application as a chemical intermediate and as a comonomer in synthetic polymers. However the cis isomer is less reactive and does not take a significant part in polymerizations. Its effect on a reaction system is essentially that of an inert diluent. Thus, capacity of a system is reduced and detrimental effects on polymerization may often be encountered by the presence of the cis isomer. The preparation of relatively pure trans-8-oxabicyclo (4.3.0) nonane thus becomes important for polymerization and other chemical processes.

The boiling points of the cis and trans isomers of 1,2-cyclohexanedimethanol differ by only a few degrees and separation of the isomers by fractional distillation requires a column with a high number of theoretical plates and also a very high reflux ratio. This same difficulty is encountered when separation by distillation of the cis and trans isomers of 8-oxabicyclo (4.3.0) nonane is attempted. For example, Birch, Dean and Whitehead report [J. Org. Chem. 19, 1449 (1954)] that a 100-plate column was required to obtain a substantially pure sample of trans-1,2-cyclohexanedimethanol from the lower boiling fractions of a cis-trans mixture while no complete separation of the higher boiling fractions was accomplished. Separation of cis and trans 8-oxabicyclo (4.3.0) nonane was obtained by repeated fractionation of mixtures of the isomers. Reported boiling points of the cyclic ethers are: trans isomer, 178° C.; cis isomer, 179.5° C. The separation of the isomers by distillation is thus very expensive both from a standpoint of equipment cost and time.

In addition to the above, experiments were conducted to determine if cis-1,2-cyclohexanedimethanol could be isomerized to the trans glycol. Thus 1,2-cyclohexanedimethanol (76% trans, 24% cis) was heated at 215° C. for 14 hours over sodium hydroxide, a well-known isomerization catalyst. The trans isomer increased to 80.3%, but this increase was accounted for by formation of 8-oxabicyclo (4.3.0) nonane of over 80% cis content. In two other experiments in which 0.1% and 0% sodium hydroxide was employed at 215° no cyclic ether was formed and the cis-trans glycol ratio was unchanged. Thus trans enrichment was not obtained by isomerization of cis-1,2-cyclohexanedimethanol.

Objects of the present invention therefore are: to provide trans-8-oxabicyclo (4.3.0) nonane of improved purity; and to provide an economically practicable process for obtaining such high purity product.

These and further objects hereinafter appearing have been attained in accordance with the present invention through the discovery that relatively pure trans-8-oxabicyclo (4.3.0) nonane can be prepared easily and economically from mixtures of cis and trans 1,2-cyclohexanedimethanol because of certain properties of the chemicals involved which heretofore have not been disclosed. First it has been found that cis-1,2-cyclohexanedimethanol dehydrates to the cyclic ether at a faster rate than trans-1,2-cyclohexanedimethanol. Thus, during the earlier stages of the dehydration reaction the cis cyclic ether is present at a greater concentration than the trans isomer. The second property important to this process is that 8-oxabicyclo (4.3.0) nonane forms an azeotrope with water distilling at 96° C. at atmospheric pressure and containing 39% of the cyclic ether. By the utilization of these two properties trans-8-oxabicyclo (4.3.0) nonane of high concentration has been produced. This has been accomplished by preferential dehydration of cis-1,2-cyclohexanedimethanol with added water present and with removal of the cis-8-oxabicyclo (4.3.0) nonane from the reaction mixture as it is formed. The cis cyclic ether is removed as the water azeotrope. The concentration of trans-1,2-cyclohexanedimethanol is thus increased in the reaction mixture as the cis glycol is consumed. The preferential dehydration of cis glycol is continued until the desired trans concentration is reached. At that time total dehydration of the remaining glycol to cyclic ether is allowed to proceed by any of the methods which have previously been disclosed.

The following examples are illustrative of this invention.

EXAMPLE 1

A 1-liter flask was fitted with stirrer, thermometer, and a distillation column which was topped with a decanter for returning water to the column while removing the organic layer. To the flask were added 433 g. of 1,2-cyclohexanedimethanol (73% trans), 4.3 g. of p-toluenesulfonic acid monohydrate and 133 g. of water. The base reaction temperature was maintained at 110° C. (reflux) with water-8-oxabicyclo (4.3.0) nonane azeotrope distilling at 96–98° C. At the end of five hours, 87 g. of the cyclic ether had been collected and consisted of 88% cis isomer. At this time the decanter was set to remove the water while returning the organic layer and the base temperature was allowed to increase to 178° C. as the water was removed. At the end of six hours no further water was observed and heating was discontinued. The reaction mixture consisted of 94% trans-8-oxabicyclo (4.3.0) nonane.

EXAMPLE 2

To the system described in Example 1 were added 433 g. 1,2-cyclohexanedimethanol (75% trans), 1.3 g. of p-toluenesulfonic acid monohydrate and 65 g. of water. The reaction mixture was brought to reflux, 125° C., and the ether-water azeotrope distilled at 98° C. At the end of 3.5 hours, 91 g. of 8-oxabicyclo (4.3.0) nonane (77% cis) had distilled. An additional 3 g. of p-toluenesulfonic acid monohydrate was added and the reaction mixture was dehydrated completely by the procedure described in Example 1. The reaction mixture was composed of 93% trans and 7% cis 8-oxabicyclo (4.3.0) nonane.

EXAMPLE 3

This experiment was conducted under the conditions of the previous examples except that 55% water and 1% p-toluenesulfonic acid monohydrate were used. A base reaction temperature of 100° C. was obtained and, at the end of ten hours, 22% of the theoretical 8-oxabicyclo (4.3.0) nonane (85% cis) had been collected. Upon complete dehydration the trans-8-oxabicyclo (4.3.0) nonane represented 92%.

EXAMPLE 4

The preferential dehydration was conducted at a pressure of 150 torr with 5% water and 1% p-toluenesulfonic acid being present. At this reduced pressure and with 5% water, a reaction temperature of 110° C. was obtained. At the end of four hours, 30% of the theoretical 8-oxabicyclo (4.3.0) nonane (75% cis) had been removed. The ether-water azeotrope distilled at 72° C./150 torr. Upon complete dehydration as previously described at atmospheric pressure and a reaction temperature of approximately 180° C., the reaction mixture was found to contain 96% trans-8-oxabicyclo (4.3.0) nonane and 4% cis-8-oxabicyclo (4.3.0) nonane.

EXAMPLE 5

In order to confirm the necessity of water (in addition to water formed from the dehydration) being present even at reduced pressure, an experiment was carried out at a pressure of 50 torr with 1% p-toluenesulfonic acid and a reaction temperature of 110° C. No water was added. At the end of five hours essentially no organic distillate had been obtained. Dehydration had occurred as the reaction mixture contained 48% of the cyclic ether (all of the cis-1,2-cyclohexanedimethanol had been dehydrated). However, in the absence of additional water it had not been possible to remove the cis isomer as the water azeotrope.

The following table illustrates the production of trans-8-oxabicyclo (4.3.0) nonane under different conditions and the necessity of water (in addition to water of reaction) being present.

TABLE—PRODUCTION OF TRANS-8-OXABICYCLO (4.3.0) NONANE

| Example | Base temp., °C. | Added water, percent | Catalyst, percent | Pressure | Trans-8-oxabicyclo (4.3.0) nonane, percent |
|---|---|---|---|---|---|
| 1 | 110 | 31 | 1.0 | Atmospheric | 94 |
| 2 | 125 | 15 | 0.3 | do | 93 |
| 3 | 100 | 55 | 1.0 | do | 92 |
| 4 | 110 | 5 | 1.0 | 150 torr | 96 |
| 5 | 110 | 0 | 1.0 | 50 torr | *58 |

*Cis-8-oxabicyclo (4.3.0) nonane had not been removed as water azeotrope.

At atmospheric pressure the preferential dehydration of the cis glycol must be carried out at a temperature of greater than 96° C. in order for the water-cyclic ether azeotrope to distill. At various reduced pressures the amount of water used will be determined by the boiling point of the azeotrope at that pressure and the reaction temperature desired. Thus, any combination of dehydration catalyst concentration, reaction temperature, pressure and water concentration may be utilized as long as the rate of dehydration of the cis glycol is significantly faster than the dehydration of the trans isomer at the selected conditions and as long as it is possible to remove the cis cyclic ether before an appreciable amount of trans cyclic ether has been formed.

Although p-toluenesulfonic acid was the catalyst used in the examples, the invention is not limited to this catalyst. Any dehydration catalyst such as sulfuric acid, phosphoric acid, metallic halides, etc. may be used which allows preferential dehydration of the cis glycol.

We claim:
1. The process for preparing trans-8-oxabicyclo (4.3.0) nonane of high purity comprising:
   (1) continuously subjecting in the presence of water a mixture of cis and trans-1,2-cyclohexanedimethanol to dehydrating conditions to form the corresponding cis and trans-8-oxabicyclo (4.3.0) nonane,
   (2) continuously azeotropically distilling with water the 8-oxabicyclo (4.3.0) nonane product as it forms which is predominantly the cis form,
   (3) and continuing the dehydration and azeotropic distillation until the desired purity of the trans isomer is obtained.
2. The process of claim 1 wherein p-toluenesulfonic acid which promotes preferential dehydration of the cis-1,2-cyclohexanedimethanol is employed.
3. The process of claim 2 wherein the distillation is carried out at essentially atmospheric pressure.

References Cited

Chemical Abstracts—Birch et al., vol. 49, ed. 15887h (1954).

ALEX MAZEL, Primary Examiner

B. I. DENTZ, Assistant Examiner